Aug. 15, 1967   D. H. STEPHENSON   3,336,512

ELECTROLYTIC CAPACITOR AND ELECTROLYTE THEREFOR

Filed Dec. 21, 1962

INVENTOR.
Donald H. Stephenson
BY *Rivies and Rivie*
Attorneys

United States Patent Office 3,336,512
Patented Aug. 15, 1967

3,336,512
ELECTROLYTIC CAPACITOR AND ELECTROLYTE THEREFOR
Donald H. Stephenson, Bennington, Vt., assignor to Tansitor Electronics, Inc., Bennington, Vt., a corporation of Vermont
Filed Dec. 21, 1962, Ser. No. 246,387
12 Claims. (Cl. 317—230)

ABSTRACT OF THE DISCLOSURE

An electrolytic capacitor and an electrolyte therefor embodying a solvent-system mixture of dimethylformamide and ethylene glycol in the proportions by weight of about 80% dimethylformamide and about 20% ethylene glycol to about 60% dimethylformamide and about 40% ethylene glycol, a film-forming ionogen being dissolved in the solvent-system mixture.

---

The present invention relates to electrolytic capacitors, such, for example, as high-voltage tantalum electrolytic capacitors. The invention relates also to electrolytes for such capacitors.

An object of the invention is to provide an electrolytic capacitor of the above-described character having a new and improved electrolyte that shall adapt the capacitor for reliable operation over a temperature range —55° C. to +125° C.

Another object of the invention is to provide a new and improved electrolyte for such a capacitor.

Other and further objects will be explained hereinafter and will be particularly pointed out in the appended claims.

Figure 1:
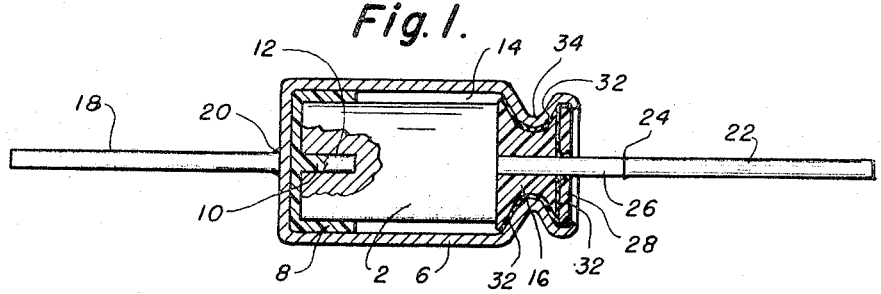
Figure 2:
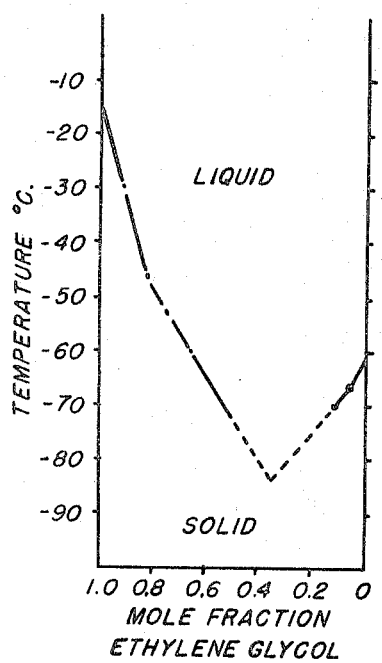
Figure 3:
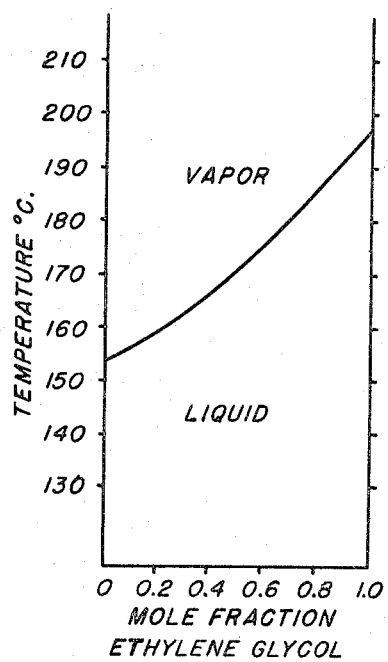
Figure 4:
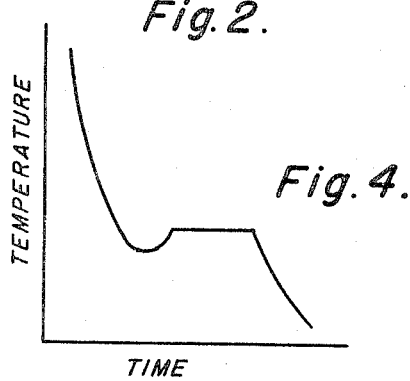

The invention will now be more fully described in connection with the accompanying drawings, in which FIG. 1 is a longitudinal section illustrating one type of electrolytic capacitor that may embody the present invention; FIG. 2 is a graph of the experimental freezing points obtained with the aid of a mixture containing varying proportions of ethylene glycol and N,N-dimethylformamide; FIG. 3 is a similar graph of corresponding boiling points; and FIG. 4 is a graph of a typical cooling curve.

One type of electrolytic capacitor is for illustration purposes shown in FIG. 1. It may comprise an inner cylindrically shaped anode electrode 2, immersed in an electrolyte that is contained in a correspondingly cylindrically shaped container 6, which may constitute the outer cathode electrode of the capacitor.

The container 6 may be constituted of any desired material such as tantalum, aluminum, silver or even a non-metal, such as a ceramic or a plastic. The anode electrode 2 may be constituted of sintered pressed powder of tantalum or other refractory, corrosion-resistant, chemically inert metal capable of forming on its surface an anodic chemically and electrically stable oxide film. Among these metals, in addition to tantalum and aluminum, are zirconium, titanium and niobium, as well as their alloys. The powder may be pressed into the shape of a cylinder to provide a porous anode of suitable height and diameter compared to the dimensions of the cathode container 6, as shown. The invention is not, however, restricted to capacitors having anodes of this type. The invention may be embodied also in electrolytic capacitors having anode electrodes of other types, such as those constituted of rolled foil.

The left-hand end of the illustrated anode electrode 2, as viewed in FIG. 1, is shown fitting snugly in a correspondingly cylindrically shaped insulating spacer 8 which, in turn, is of dimensions to fit snugly at the left-hand or bottom end of the cathode container electrode 6, in order to prevent short-circuiting between the anode and cathode electrodes 2 and 6. For purposes of facilitating assembly, the insulating spacer 8 may be provided with an integral projection 10 fitting snugly in a correspondingly shaped opening 12 extending longitudinally inward into the anode electrode 2 from its said left-hand or bottom end. The anode electrode 2 is considerably longer than the length of the insulating spacer 8, thus providing a very narrow space 14 of separation between the anode and cathode electrodes 2 and 6, in which the electrolyte is contained.

The cathode container 6 is shown open at its right-hand end, and this open end is shown closed by an insulating plug or bushing 16. The insulating plug or bushing 16 is shown of shape and diameter to conform to corresponding shaped inner walls of the cathode container 6. A lead-wire conductor 18 may be soldered, welded or otherwise secured, as shown at 20, to the outer bottom surface wall of the cathode container 6. A lead-wire conductor 22 may similarly, as by means of a weld 24, be joined to an integral projection 26, of the anode electrode 2. The lead-wire electrode conductors 18 and 22 may be constituted of the same metals as the metals of the electrodes 2 and 6 or any other or equivalent metal. The integral projection 26 of the anode electrode 2 is shown extending through a plug or bushing 16, and also through an additional disc-shaped end-seal plug or bushing 28.

The portions of the walls of the cathode container 6 near its open end are shown in FIG. 1 at 34 crimped into snug tight engagement with the end walls of the plug 16, with a sealing compound 32 interposed. The plugs 16 and 28, the spacer 8 and other insulating parts may be constituted of polytetrafluoroethylene, marketed under the trademark Teflon, or polyfluorochlorethylene, marketed under the trademark Kel-F.

The capacitor described above and illustrated by FIG. 1 is known in the trade as of the wet-slug type. Capacitors of this and other types are required to operate reliably over a temperature range from —55° C. to +125° C. The electrolytes employed with high-voltage capacitors of this type comprise solvents in which are dissolved various salts and other ionogens or solutes. Not all solvents, however, can withstand subjection either to the high voltages or to so wide a range of temperatures without destroying the stability of the capacitor. The difficulties are encountered particularly at the lower temperatures. The art has for many years been seeking a suitable solvent or multi-solvent system.

Among the solvents that have been used for these electrolytes has been dimethylformamide, the attractive feature of which has been that its freezing point is listed in the tables as in the neighborhood of —61° C. In other respects, however, it is not the most ideal solvent, wherefore attempts have been made to add to it co-solvents having additional desirable characteristics that are lacking from dimethylformamide.

The applicant has experimented with a number of such co-solvents, among them ethylene glycol. Ethylene glycol would appear, at first blush, unpromising, because its freezing point is listed in the tables as in the neighborhood of only —17° C. It is a well known fact, however, that the freezing point of a mixture of two completely miscible liquids, in suitable proportions, is in many cases lower than that of either liquid alone. With liquids of some mixtures, indeed, there is a particular proportion of the two liquids at which a minimum freezing temperature is obtained. In systems of this type where the solid phase that separates out from the liquid phase, at the freezing temperature, consists of pure components, this freezing-temperature point is called the eutectic.

An investigation was accordingly carried out in order to determine whether a mixture of dimethylformamide and ethylene glycol, among other preferred co-solvents, in suitable proportions, could perhaps be used as a solvent system for an electrolyte of the above-described character at as low a temperature as −55° C.

The investigation comprised measuring not only the freezing, but also the boiling, temperatures of mixtures of ethylene glycol and dimethylformamide, in different proportions, over the entire range from 100% ethylene glycol to 0% dimethylformamide to 0% ethylene glycol to 100% dimethylformamide, in steps of approximately 10% increments of change in the concentration of the individual ingredients of the mixture.

The details of the procedure were as follows:

(A) *Freezing points.*—The various ethylene glycol-N, N-dimethylformamide solutions were made using transfer and volumetric pipettes to measure the two components. A sample of each solution was placed in a test tube fitted with a cork stopper. A copper-constantan thermocouple was placed in a glass tube, with one end sealed, so that the junction of the thermocouple rested on the sealed end of the tubing. This tube was then introduced into the test tube through the cork stopper so that the junction of the thermocouple was about ¼ inch above the bottom of the test tube. The sample was then cooled and the temperature, as indicated by the thermocouple, was recorded at thirty-second intervals. Initially the samples were cooled in the low-temperature test chamber which had been set to hold at its minimum temperature (about −65° C.). Later, the method of cooling the samples was changed in that a mixture of Dry Ice and methanol was used, reaching a temperature of −78.7° C., without any serious changes in the cooling curves obtained for the samples.

The temperature was plotted as a function of time for each sample studied. At the freezing point, the temperature tended to remain constant and the cooling curve flattened out, for a short time interval. FIG. 4 is a typical type of cooling curve obtained in these studies. The dip observed in the cooling curve, before the curve flattened out, is due to super-cooling of the liquid, and occurred with all samples.

(B) *Boiling points.*—Various ethylene glycol-N,N-dimethylformamide solutions were made, as in the freezing-point studies. About 150 ml. of each mixture studied was placed in a 500 ml., three-neck, distilling flask. About a dozen boiling chips were added to prevent super-heating of the liquid and to promote even heating. A mercury thermometer was introduced into the flask through a cork stopper in one neck. This thermometer was placed so that the bulb was located in the vapor phase above the surface of the liquid. A second thermometer was introduced into the flask through a cork stopper in the second neck of the flask and placed so that the bulb was located in the liquid without being allowed to touch the walls of the flask. An air-cooled condenser was introduced into the flask through a cork stopper in the middle neck of the flask so that all the condensed vapor would flow back into the flask. The flask was then heated with a Glas-Col mantle until the boiling point of the system being studied was reached. The system was allowed to come to equilibrium and the temperature of both the liquid and the vapor was recorded. The thermometers used for this study had been calibrated over their temperature range so that the observed values could be corrected.

TEST RESULTS (A) *Freezing points.*—A summary of the freezing point studies is given in Table I. The freezing points of three samples could not be determined because the particular system employed to cool the samples did not yield a sufficiently low temperature.

TABLE I.—COMPOSITION OF SYSTEM

| Mole Fraction | | Percent by weight | | Freezing Point, ° C. (best value) |
|---|---|---|---|---|
| DMF | EG | DMF | EG | |
| 0.000 | 1.000 | 0 | 100 | −14.33 |
| 0.0806 | 0.914 | 10 | 90 | −30.0 |
| 0.175 | 0.825 | 20 | 80 | −45.6 |
| 0.266 | 0.734 | 30 | 70 | −52.7 |
| 0.360 | 0.640 | 40 | 60 | −60.0 |
| 0.458 | 0.542 | 50 | 50 | −71.32 |
| 0.558 | 0.442 | 60 | 40 | ---------- |
| 0.663 | 0.337 | 70 | 30 | ---------- |
| 0.772 | 0.228 | 80 | 20 | ---------- |
| 0.884 | 0.116 | 90 | 10 | −70.32 |
| 0.941 | 0.059 | 95 | 5 | −66.9 |
| 1.000 | 0.000 | 100 | 0 | −61.57 |

The freezing points were plotted as a function of temperature and this curve is given in FIG. 2.

(B) *Boiling points.*—A summary of the boiling point studies is given in Table II. The boiling point of the system increased regularly with increasing ethylene-glycol concentration. The boiling points recorded were those values which were maintained in the liquid for a five-minute period.

TABLE II.—COMPOSITION OF SYSTEM

| Mole Fraction | | Percent by Weight | | Boiling Point, ° C. (corrected) | Vapor Temperature, ° C. (corrected) |
|---|---|---|---|---|---|
| DMF | EG | DMF | EG | | |
| 1.000 | 0.000 | 100.0 | 0.0 | 153 | 152.9 |
| 0.899 | 0.101 | 91.33 | 8.67 | 156.1 | 154.9 |
| 0.801 | 0.199 | 82.59 | 17.41 | 159.2 | 157.4 |
| 0.700 | 0.300 | 73.36 | 26.64 | 162.3 | 161.0 |
| 0.599 | 0.401 | 63.79 | 36.21 | 166.4 | 162.0 |
| 0.497 | 0.503 | 53.93 | 46.07 | 170.5 | 168.1 |
| 0.401 | 0.599 | 44.03 | 55.97 | 175.5 | 168.1 |
| 0.300 | 0.700 | 33.53 | 66.47 | 180.2 | 177.1 |
| 0.201 | 0.799 | 22.83 | 77.17 | 185.9 | 182.2 |
| 0.100 | 0.900 | 11.59 | 88.41 | 191.0 | 187.7 |
| 0.000 | 1.000 | 0.0 | 100.0 | 199.3 | 198.3 |

The boiling points were plotted as a function of temperature and this curve is given in FIG. 3.

(C) *Discussion.*—The results from these freezing-point and boiling-point studies should be considered as approximate, because there are possible sources of error.

(1) Since the ethylene glycol and the N,N-dimethylformamide are both hygroscopic, an indeterminate amount of water was probably present in all the samples studied. This would influence both the freezing and boiling points of all the systems.

(2) Supercooling probably occurred, which meant that no sharp break was observed in the cooling curves obtained for most samples and the freezing-point values had to be obtained by extrapolation.

(3) Errors in boiling points may have been introduced, primarily because the volumes employed could result in a change in the composition of the liquid phase while the equilibrium was being established, and also because there would be a tendency for the liquid to superheat.

(4) The compositions of the mixtures studied was not known with any degree of accuracy. It was assumed that both the ethylene glycol and the N,N-dimethylformamide were pure and the specific gravities of these two substances were their reported values, namely: Ethylene glycol, sp. gr.=1.1155 g./ml.; and N,N-dimethylformamide, sp. gr.=0.954 g./ml.

The following additional conclusions are arrived at as a result of the above investigation:

(1) The freezing point determinations for the ethylene glycol-N,N-dimethylformamide system shows that the system does form a eutectic mixture. The cooling curves for various mixtures of these two substances show relatively sharp breaks at the freezing points, which indicates that the system does not form solid solutions.

(2) The eutectic mixture has a composition of about 29.5% ethylene glycol and about 70.5% N,N-dimethylformamide by weight. The freezing point for this mixture is about −90° C.

(3) The boiling point increases regularly with increasing ethylene-glycol concentration.

(4) Based on the freezing-point studies, any mixture from about 50% to 90% N,N-dimethylformamide by weight, and, more particularly, 60% to 80% could be employed without any serious problems at −55° C.

The above-described solvent system may, of course, be modified by the addition thereto of a further solvent or solvents, in suitable proportions, the action of which, however, does not interfere with the action of the ethylene glycol or the dimethylformamide, but which may possess additional desirable characteristics. Many such solvents are known to the art.

The solutes or ionogens employed with the improved solvent system of the present invention, for the purpose of providing the necessary conductivity thereto, may be one or more of many film-forming ionogens that are known to the art, and that, in suitable proportions, are soluble in the said improved solvent system. They are usually salts of various kinds, in proportions that will not precipitate out at the lower temperatures of operation of the capacitor; indeed, their very presence may itself serve to lower still further the freezing temperature. Among the ionogens suitable for the purposes of the present invention, for example, is ammonium borate. The permissible concentration of the ionogen may depend upon the voltage of operation of the capacitor. The electrolyte may contain also various proportions of mineral or organic acids or other ingredients, such as lithium chloride.

Exceedingly good results have been obtained, for example, with an electrolyte comprising about 50% to 70% dimethylformamide, about 20% to 40% ethylene glycol, and about 5% to 20% of a suitable ionogen or salt. For optimum efficiency, it is desirable to vary these proportions in accordance with the voltage and temperature conditions of operation.

As one illustration of a very effective capacitor, under particular conditions of operation of voltage and temperature, the electrolyte may comprise a solvent-system mixture of dimethylformamide and ethylene glycol in about 70% dimethylformamide and about 22% to 25% ethylene glycol, and about 4% to 5% ammonium borate dissolved therein. The electrolyte may contain also merely a trace of water, but, in other aspects, it is essentially non-aqueous.

Further modifications will occur to persons skilled in the art and all such are considered to fall within the spirit and scope of the invention, as defined in the appended claims.

What is claimed is:

1. An electrolyte for an electrolytic capacitor comprising a solvent-system mixture of dimethylformamide and ethylene glycol in the proportions by weight of from about 80% dimethylformamide and about 20% ethylene glycol to about 60% dimethylformamide and about 40% ethylene glycol, and a film-forming ionogen dissolved in the solvent-system mixture.

2. An electrolyte for an electrolytic capacitor comprising a mixture of dimethylformamide and ethylene glycol in the proportions by weight of from about 60% to 70% dimethylformamide and about 20% to 40% ethylene glycol, and about 5% to 20% of a film-forming ionogen dissolved in the mixture.

3. An electrolyte for an electrolytic capacitor comprising a mixture of dimethylformamide and ethylene glycol in the proportions by weight of about 70% dimethylformamide and about 22% to 25% ethylene glycol, and a film-forming ionogen dissolved in the mixture.

4. An electrolyte for an electrolytic capacitor comprising a mixture of dimethylformamide and ethylene glycol in the proportions by weight of about 70% dimethylformamide and about 22% to 25% ethylene glycol, and ammonium borate dissolved in the mixture.

5. An electrolyte for an electrolytic capacitor comprising a mixture of dimethylformamide and ethylene glycol in the proportions by weight of about 70% dimethylformamide and about 22% to 25% ethylene glycol, and about 4% to 5% ammonium borate dissolved in the mixture, the electrolyte being essentially non-aqueous.

6. An electrolyte for an electrolytic capacitor comprising a mixture of dimethylformamide and ethylene glycol in the proportions by weight of about 70% dimethylformamide and about 22% to 25% ethylene glycol, and about 4% to 5% ammonium borate dissolved in the mixture, the electrolyte containing only a trace of water.

7. An electrolytic capacitor comprising a cathode electrode, an anode electrode, one of the electrodes comprising a film-forming metal with a dielectric film, and an electrolyte comprising a solvent-system mixture of dimethylformamide and ethylene glycol in the proportions by weight of from about 80% dimethylformamide and about 20% ethylene glycol to about 60% dimethylformamide and about 40% ethylene glycol, a film-forming ionogen being dissolved in the solvent-system mixture.

8. An electrolytic capacitor comprising a cathode electrode, an anode electrode, one of the electrodes comprising a film-forming metal with a dielectric film, and an electrolyte comprising a mixture of dimethylformamide and ethylene glycol in the proportions by weight of from about 60% to 70% dimethylformamide and about 20% to 40% ethylene glycol, about 5% to 20% of a film-forming ionogen being dissolved in the mixture.

9. An electrolytic capacitor comprising a cathode electrode, an anode electrode, one of the electrodes comprising a film-forming metal with a dielectric film, and an electrolyte comprising a mixture of dimethylformamide and ethylene glycol in the proportions by weight of about 70% dimethylformamide and about 22% to 25% ethylene glycol, a film-forming ionogen being dissolved in the mixture.

10. An electrolytic capacitor comprising a cathode electrode, an anode electrode, one of the electrodes comprising a film-forming metal with a dielectric film, and an electrolyte comprising a mixture of dimethylformamide and ethylene glycol in the proportions by weight of about 70% dimethylformamide and about 22% to 25% ethylene glycol, ammonium borate being dissolved in the mixture.

11. An electrolytic capacitor comprising a cathode electrode, an anode electrode, one of the electrodes comprising a film-forming metal with a dielectric film, and an electrolyte comprising a mixture of dimethylformamide and ethylene glycol in the proportions by weight of about 70% dimethylformamide and about 22% to 25% ethylene glycol, about 4% to 5% ammonium borate being dissolved in the mixture, and the electrolyte being essentially non-aqueous.

12. An electrolytic capacitor comprising a cathode electrode, an anode electrode, one of the electrodes comprising a film-forming metal with a dielectric film, and an electrolyte comprising a mixture of dimethylformamide and ethylene glycol in the proportions by weight of about 70% dimethylformamide and about 22% to 25% ethylene glycol, about 4% to 5% ammonium borate being dissolved in the mixture, and the electrolyte containing only a trace of water.

References Cited

UNITED STATES PATENTS

| | | | |
|---|---|---|---|
| 2,934,682 | 4/1960 | Schwarz et al. | 317—230 |
| 2,944,026 | 7/1960 | Robinson | 317—230 |
| 2,965,816 | 12/1960 | Ross | 317—230 |
| 3,138,746 | 6/1964 | Burger | 317—230 |

JAMES D. KALLAM, *Primary Examiner.*